No. 669,476. Patented Mar. 5, 1901.
J. H. BULLARD.
VALVE.
(Application filed Aug. 1, 1900.)
(No Model.)
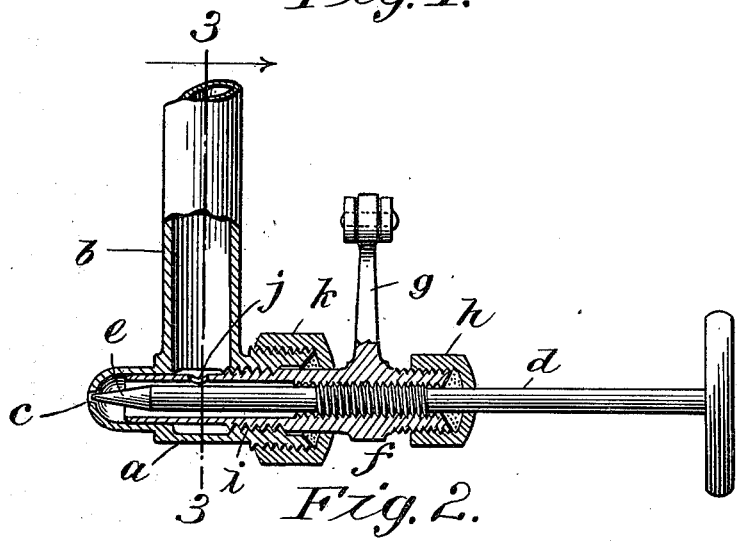
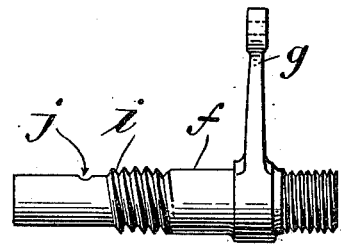
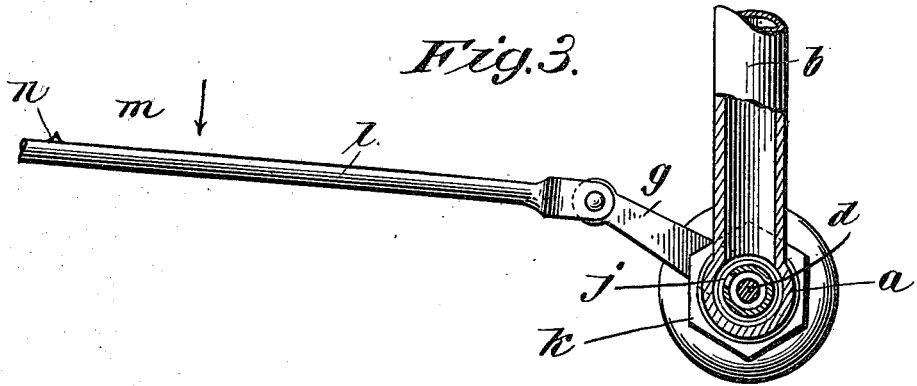

UNITED STATES PATENT OFFICE.

JAMES H. BULLARD, OF SPRINGFIELD, MASSACHUSETTS, ASSIGNOR TO THE OVERMAN AUTOMOBILE COMPANY, OF CHICOPEE, MASSACHUSETTS.

VALVE.

SPECIFICATION forming part of Letters Patent No. 669,476, dated March 5, 1901.

Application filed August 1, 1900. Serial No. 25,553. (No model.)

*To all whom it may concern:*

Be it known that I, JAMES H. BULLARD, a citizen of the United States of America, residing at Springfield, in the county of Hampden and State of Massachusetts, have invented new and useful Improvements in Valves, of which the following is a specification.

This invention relates to valves.

The object thereof is to provide means whereby a valve adjusted to deliver a certain fixed volume of liquid or gas may be made to temporarily deliver a much larger or smaller volume than that provided for in its normal adjustment without disturbing that adjustment—that is to say, the delivery of the substance through the valve may be either temporarily increased or diminished and the valve parts then returned to precisely the same relative position they occupied before said increase or diminution; and the invention consists in the construction described in the following specification and clearly set forth in the claim.

In the drawings forming part of this specification, Figure 1 shows in sectional elevation a valve construction embodying this invention. Fig. 2 is a side elevation of a part of the valve. Fig. 3 is a sectional elevation on line 3 3, Fig. 1.

In certain arts valves are required which have a certain fixed duty—that is to say, their function is to deliver a certain quantity of a gas or liquid continuously. These valves as used in many places must be adjusted to a nicety—as, for instance, in valves which are adapted to deliver gaseous fuel—whereby a uniform temperature, or as nearly so as possible, is to be maintained. Occasion frequently arises, however, for temporarily varying the volume of gas or liquid passing through the valve. If this is accomplished by the simple manipulation of the valve-stem by turning it in and out to open or close the valve more or less, as in the ordinary manner, the fine normal adjustment of the valve is destroyed and the valve must be reset by careful trials to its normal position. By means of this invention, however, the delivery of the valve may be varied either way from the normal at will and the parts of the valve then returned to precisely the position they occupied before they were disturbed to effect said variation. This valve may be made in any of the usual forms in which the valve is opened and closed by the rotation of a valve-stem.

In the drawings a type of valve known generally as the "needle-valve" has been shown, in which $a$ represents the body of the valve, having cast thereon an inlet-pipe $b$. One end of said body $a$ is rounded off and provided with a central aperture $c$. The valve-stem $d$ has a tapered point $e$, as shown, which is adapted to enter the aperture $c$ and close the same. This stem $d$ is screwed into a long sleeve $f$, having thereon an arm $g$. This sleeve has two screw-threads cut thereon—one at the end thereof, to receive a packing-nut $h$, and the other (indicated by $i$) adapted to be screwed into the valve-body, as shown in Fig. 1. When this sleeve $f$ is in position within the valve-body, the forward end thereof extends well over into the delivery end of the body, whereby the sleeve is rigidly supported in the latter. An aperture $j$ is made through the wall of this sleeve at a point substantially opposite the inlet-pipe $d$, whereby free access of either gas or liquid may be had through the sleeve to the aperture $c$. It is immaterial, except from the point of view of good construction, whether the said sleeve $f$ extends across the inlet-pipe $b$ or not. Its operation will be the same as if it were cut off at the end of the thread $i$. The latter is preferably a much more rapid thread than the screw-thread cut upon the valve-stem within the sleeve, to the end that a slight degree of rotation of the sleeve may produce a considerable movement of the valve-stem which it carries. The body $a$ is provided with a packing-nut $k$, as shown in Fig. 1.

The parts being assembled, as shown in Fig. 1, the valve-stem $d$ may be manipulated to adjust its point in such relation to the aperture $c$ that a fixed delivery of the valve may be assured. After the valve has once been adjusted if the arm $g$ be oscillated that adjustment may be varied in either direction—that is, to open the valve wider or to close it, as may be desired. This may be effected from a point remote from the valve by means of a connection, as at $l$. If the valve is so set that the arm $g$ may be swung in either direction, then some mark or point, as the arrow $m$, should be provided, with which another point $n$ on the rod $l$ may be brought into registration, whereby the position of normal adjustment of the valve parts may be indicated. As a rule, however, this valve construction is employed where only one variation of the supply of gas, &c., passing through the valve is desired and that variation is in the direction of a temporarily-increased supply. This variation is usually provided for by means of a lever (not shown in the drawings) connected with the rod $l$ at any point, which lever has a definite throw, and when any increase in the delivery of the valve is required the lever is thrown over to provide for said increase and thrown back to restore the valve to its normal condition of delivery.

Having thus described my invention, what I claim, and desire to secure by Letters Patent of the United States, is—

In a valve, the body having an inlet-pipe, one end of the body provided with a central aperture, combined with a threaded valve-stem having a tapered point to engage with the central aperture, a screw-threaded sleeve applied to the stem, and provided with an arm near its outer end, and a screw-thread to engage with the body, an aperture through one side so as to make connection with the inlet-pipe, and having its inner end open; and a packing-nut applied to the outer end of the sleeve, and through which the stem passes, substantially as shown.

JAMES H. BULLARD.

Witnesses:
H. A. CHAPIN,
K. I. CLEMONS.